US012563534B2

(12) United States Patent
    Amaya Gonzalez

(10) Patent No.: US 12,563,534 B2
(45) Date of Patent: Feb. 24, 2026

(54) DYNAMIC FREQUENCY RESOURCE ALLOCATION STRATEGY DEPLOYMENT

(71) Applicant: DISH Wireless L.L.C., Englewood, CO (US)

(72) Inventor: Norberto Amaya Gonzalez, Littleton, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 418 days.

(21) Appl. No.: 18/159,525

(22) Filed: Jan. 25, 2023

(65) Prior Publication Data

US 2024/0147434 A1     May 2, 2024

Related U.S. Application Data

(60) Provisional application No. 63/419,618, filed on Oct. 26, 2022.

(51) Int. Cl.
    *H04W 72/0446*     (2023.01)
    *H04W 72/56*     (2023.01)
(52) U.S. Cl.
    CPC ....... *H04W 72/0446* (2013.01); *H04W 72/56* (2023.01)
(58) Field of Classification Search
    CPC ........................... H04W 72/0446; H04W 72/56
    See application file for complete search history.

(56) References Cited

U.S. PATENT DOCUMENTS

| 2012/0170498 A1 | 7/2012 | Gustavsson et al. |
| 2018/0092081 A1 | 3/2018 | Chen et al. |
| 2021/0227403 A1* | 7/2021 | Tsui ...................... H04W 24/02 |

FOREIGN PATENT DOCUMENTS

| EP | 2 129 154 A1 | 12/2009 | |
| WO | WO-2016034198 A1 * | 3/2016 | .............. H04W 4/70 |

OTHER PUBLICATIONS

Invitation to Pay Additional Fees for PCT/US2023/077538, mailed Mar. 1, 2024, 18 pages.

* cited by examiner

*Primary Examiner* — Michael A Keller
(74) *Attorney, Agent, or Firm* — Seed Intellectual Property Law Group LLP

(57)     ABSTRACT

Systems and methods are described herein for employing dynamic physical resource block allocation strategies and schemes among a plurality of wireless network cells. A plurality of physical resource block allocation strategies are generated for the plurality of cells. A plurality of allocation schemes are then generated for the plurality of cells, wherein each separate allocation scheme of the plurality of allocation schemes defines a different utilization procedure for the plurality of physical resource block allocation strategies. Separate allocation schemes are assigned to separate cells. Each cell utilizes its assigned allocation scheme to allocate physical resource blocks to user devices.

19 Claims, 9 Drawing Sheets

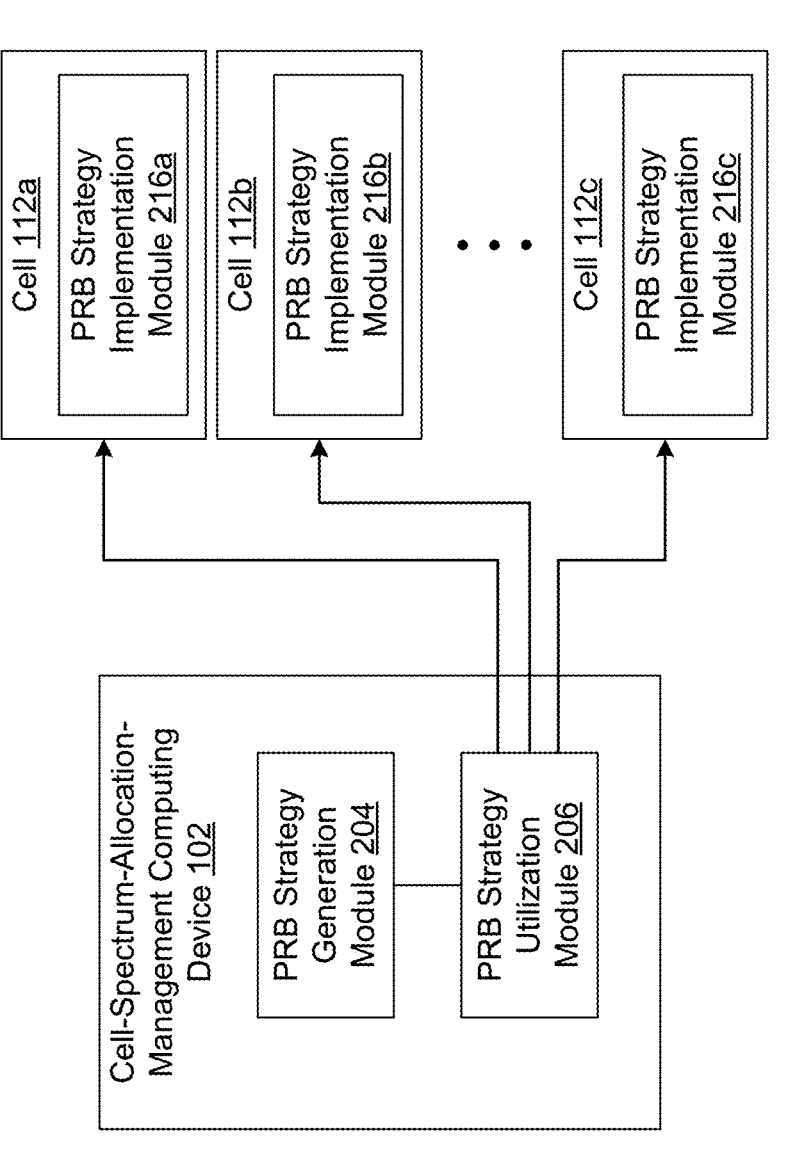
*FIG. 2*

Figure 6:
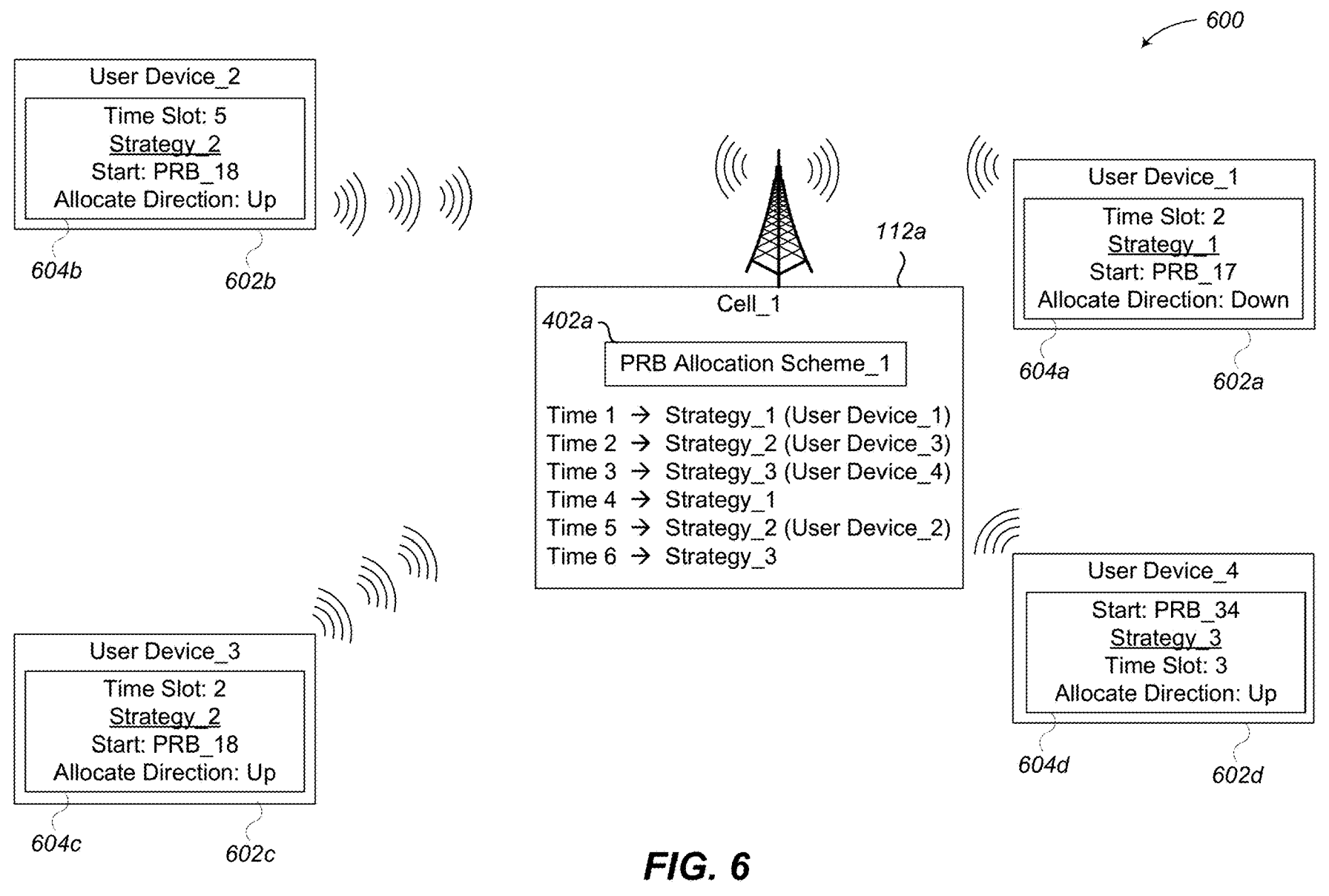

User Device_1 602a
Time Slot: 2
Strategy_1
Start: PRB_17
Allocate Direction: Down
604a

User Device_4 602d
Start: PRB_34
Strategy_3
Time Slot: 3
Allocate Direction: Up
604d 112a

Cell_1
402a

PRB Allocation Scheme_1

Time 1 → Strategy_1 (User Device_1)
Time 2 → Strategy_2 (User Device_3)
Time 3 → Strategy_3 (User Device_4)
Time 4 → Strategy_1
Time 5 → Strategy_2 (User Device_2)
Time 6 → Strategy_3

User Device_2 602b
Time Slot: 5
Strategy_2
Start: PRB_18
Allocate Direction: Up
604b

User Device_3 602c
Time Slot: 2
Strategy_2
Start: PRB_18
Allocate Direction: Up
604c

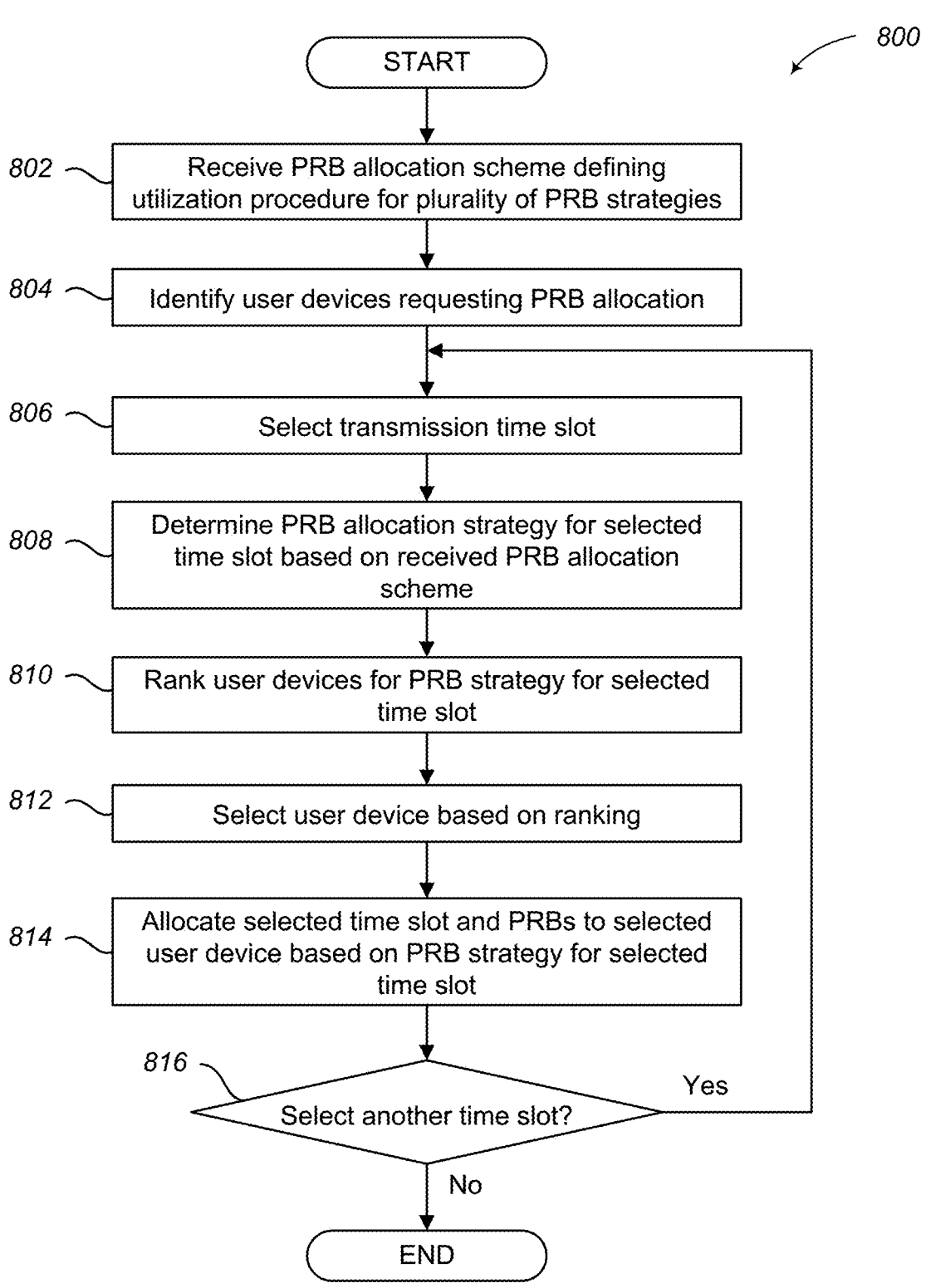

*800*

START

802 — Receive PRB allocation scheme defining utilization procedure for plurality of PRB strategies 804 — Identify user devices requesting PRB allocation 806 — Select transmission time slot 808 — Determine PRB allocation strategy for selected time slot based on received PRB allocation scheme 810 — Rank user devices for PRB strategy for selected time slot 812 — Select user device based on ranking 814 — Allocate selected time slot and PRBs to selected user device based on PRB strategy for selected time slot 816 — Select another time slot?

Yes

No

END

*FIG. 8*

DYNAMIC FREQUENCY RESOURCE ALLOCATION STRATEGY DEPLOYMENT

BACKGROUND

The use of cellular networks continues to expand and people are becoming more reliant on the speed, efficiency, and uptime of these networks. When communicating with a cell tower, the cell tower generally instructs the cellular device when and how to send or receive data. These instructions are often referred to as frequency resource allocation. When there are multiple cellular devices within range of multiple cell towers, many of these frequency resource allocations can overlap with one another, which can result in communication collisions, interference, delayed transmissions, or other communication issues. It is with respect to these and other considerations that the embodiments described herein have been made.

BRIEF SUMMARY

Embodiments are generally directed to systems and methods for employing dynamic physical resource block (PRB) allocation strategies and schemes among a plurality of cells in a network. Separate cells are provided or assigned different PRB allocation schemes, which define or map different PRB allocation strategies to different transmission time slots. The cells then use their assigned PRB allocation schemes to allocate PRBs to user devices. In this way, the interference by user device transmissions can be reduced, while also improving PRB allocation based on transmission capabilities of the user devices.

Embodiments described herein improve the efficiency of cell towers or user devices, or cellular or wireless networks in general. By having multiple cell towers dynamically use differing frequency resource allocation strategies, there is less interference and fewer data collisions within the network. As a result, cell towers and user devices save computing resources by not having to re-send data, re-request frequency allocations, or re-process frequency allocations, which also improves network bandwidth utilization.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 2 is a context diagram of a non-limiting embodiment of a system utilizing dynamic frequency resource allocation strategies in accordance with embodiments described herein;

FIGS. 3-6 illustrate example use case scenarios of utilizing dynamic frequency resource allocation strategies in accordance with embodiments described herein;

FIG. 8 illustrates a logical flow diagram showing one embodiment of a process for employing dynamic frequency resource allocation strategies in accordance with embodiments described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
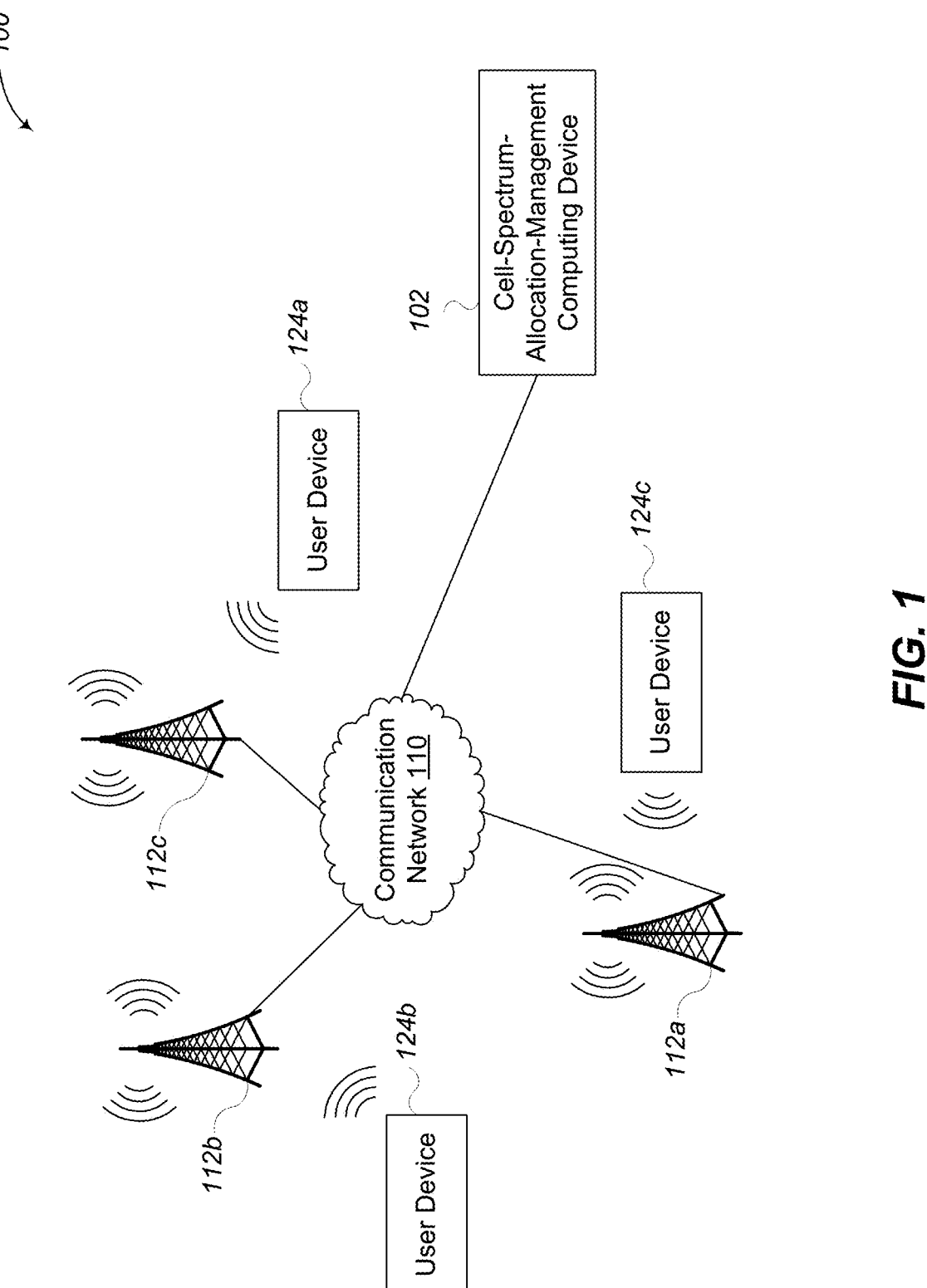
FIG. 1 illustrates a context diagram of an environment for utilizing dynamic frequency resource allocation strategies in a wireless network in accordance with embodiments described herein.

FIG. 1 illustrates a context diagram of an environment 100 for utilizing dynamic frequency resource allocation strategies in a wireless network in accordance with embodiments described herein. Environment 100 includes a plurality of cells 112a-112c, a plurality of user devices 124a-124b, a cell-spectrum-allocation-management computing device 102, and a communication network 110. Communication network 110 includes one or more wired or wireless networks, which may include a series of smaller or private connected networks that carry information between the cells 112a-112c, and between the cells 112a-112c and the cell-spectrum-allocation-management computing device 102, and between the cells 112a-112c and other computing devices (not shown).

The user devices 124a-124c (collectively or individually referred to as user devices 124 or user device 124) are computing devices that receive and transmit cellular communication messages with cells 112a-112c. Examples of user devices 124a-124c may include, but are not limited to, mobile devices, smartphones, tablets, cellular-enabled laptop computers, or other computing devices that can communication with a cellular network. In some embodiments, the user devices 124a-124c may also be referred to as user equipment or UEs.

The cells 112a-112c (collectively or individually referred to as cells 112 or cell 112) are cellular network towers that together provide the hardware infrastructure of a cellular communications network, e.g., a 5G cellular communications network. Cells 112a-112c include or may also be referred to as towers or cell towers. The cell 112a-112c may include or be in communication with base stations, radio back haul equipment, antennas, or other devices, which are not illustrated for ease of discussion. Each cell 112 provides compatible cellular communications over a coverage area. The coverage area, bandwidth, and overall communication quality depends on multiple factors regarding the cell, including, but not limited to, height of the antenna of the cell above the ground, radio parameters, weather conditions, etc. Although FIG. 1 shows three cells 112a-112c, embodiments are not so limited and other numbers of cells may be utilized.

User devices 124a-124c communicate with a specifically selected or assigned cell 112 to transmit data to or to facilitate communication with other user devices 124a-124c or other computing devices (not illustrated). A cell 112 is selected for a particular user device 124 based on one or more different networking criteria, such as current load on the cells 112a-112c, proximity between the user device 124 and a cell 112, current interference, type of data being transmitted by the user device 124, etc. In various situations and scenarios, a cell 112 may not be communicating with any user devices 124 or a cell 112 may be communicating with a plurality of user devices 124. Although FIG. 1 shows three user devices 124a-124c, embodiments are not so limited and other numbers of user devices may be utilized.

The cell-spectrum-allocation-management computing device 102 is configured to generate a plurality of PRB allocation strategies, which are then used to generate a plurality of PRB allocation schemes, as described herein. Briefly, a physical resource block (PRB) is a section or band of frequency spectrum for a given amount of time (e.g., during a transmission time slot) that a user device 124 can utilize to transmit data to a cell 112. As described herein, a PRB allocation scheme identifies which PRB allocation strategy a cell 112 is to use to allocate PRBs to user devices 124 for different time slots. Each PRB allocation strategy identifies a starting PRB and a direction of allocation (PRBs in a higher frequency direction or PRBs in a lower frequency direction), which is described in more detail below. The cell-spectrum-allocation-management computing device 102 assigns separate PRB allocation schemes to separate cells 112a-112c.

In some embodiments, the cell-spectrum-allocation-management computing device 102 may be separate from the one or more cells 112a-112c, as is shown in FIG. 1. In other embodiments, the cell-spectrum-allocation-management computing device 102 or its functionality may be included with or performed by one or more of the cells 112a-112c.

When a user device 124 wants to transmit data or communications to another user device or computing device, the user device 124 sends a request to its assigned cell 112. This request generally identifies an amount of data in which the user device 124 intends to transmit, a type of data, information about the user device 124, etc. In response, the assigned cell 112 employs embodiments described herein to instruct the user device 124 when, how much, and how to transmit data. As described herein, the cell 124 is assigned a physical resource block (PRB) allocation scheme to use when instructing user devices 124 when and how to transmit data. The cell 112 utilizes its assigned PRB allocation scheme to select a specific transmission time slot and one or more specific physical resource blocks (PRB) to allocate to the requesting user device 124. In this way, the cell 112 is utilizing the allocation of PRBs to instruct the user device 124 of which specific radio frequencies it can use to transmit data and when. The user device 124 can then transmit data to the cell 112 during the allocated time slot using the allocated PRBs.

FIG. 2 is a context diagram of a non-limiting embodiment of a system 200 utilizing dynamic frequency resource allocation strategies in accordance with embodiments described herein. System 200 may include the cell-spectrum-allocation-management computing device 102 and cells 112a-112c from FIG. 1.

The cell-spectrum-allocation-management computing device 102 is configured to generate and assign PRB allocation schemes to cells 112a-112c, as described herein. The cell-spectrum-allocation-management computing device 102 may include a PRB strategy generation module 204 and a PRB strategy utilization module 206. Although the PRB strategy generation module 204 and a PRB strategy utilization module 206 are illustrated as two separate modules, embodiments are not so limited. Rather, one module or a plurality of modules may be utilized to employ the functionality of the PRB strategy generation module 204 and a PRB strategy utilization module 206, which may include process 700 in FIG. 7.

The PRB strategy generation module 204 is configured to generate a plurality of different PRB allocation strategies for the cells 112a-112c. As described herein, a PRB allocation strategy defines a starting PRB and a direction of allocation for a cell 112 to use when allocating PRBs to requesting user devices. In some embodiments, the PRB strategy generation module 204 may dynamically generate, change, or modify the plurality of PRB allocation strategies for the cells 112a-112c based on feedback provided by one or more of cells 112a-112c; a number of cells 112 in a group, in a network, or in a geographical area; or a number of user devices communicating with the cells 112; or some combination thereof. The feedback from the cells 112 may indicate how often a PRB allocation strategy is used, whether there was a substantially amount of interference when using a PRB allocation strategy (e.g., if the interference exceeds a selected threshold), a number of user devices communicating with the cell 112, etc.

The PRB strategy utilization module 206 is configured to generate a plurality of different PRB allocation schemes for the cells 112a-112c from the plurality of PRB allocation strategies generated by the PRB strategy generation module 204. As described herein, a PRB allocation scheme defines which PRB allocation strategy a cell 112 is to use for a particular transmission time slot. The PRB strategy utilization module 206 provides or assigns different PRB allocation schemes to the cells 112a-112c. In various embodiments, the PRB strategy utilization module 206 may dynamically generate, change, or modify the plurality of PRB allocation schemes for the cells 112a-112c based on the feedback provided by one or more of cells 112a-112c.

In some embodiments, the cell-spectrum-allocation-management computing device 102 may employ one or more PRB strategy generation modules 204 to generate separate or different PRB allocation strategies for different groups of cells 112. Similarly, in some embodiments, the cell-spectrum-allocation-management computing device 102 may employ one or more PRB strategy utilization modules 206 to generate and assign separate or different PRB allocation schemes for different groups of cells 112.

The cell 112a-112c may include a PRB strategy implementation module 216a-216c, respectively. The PRB strategy implementation modules 216a-216c receive separate PRB allocation schemes from the PRB strategy utilization module 206 of the cell-spectrum-allocation-management computing device 102. Each PRB strategy implementation module 216a-216c utilizes its received or assigned PRB allocation scheme to allocate time slots and PRBs to user devices, as described herein. Although each PRB strategy implementation modules 216 is illustrated as a single module, embodiments are not so limited. Rather, one module or a plurality of modules may be utilized to employ the functionality of the PRB strategy implementation modules 216, which may include process 800 in FIG. 8.

FIGS. 3-6 illustrate example use case scenarios of utilizing dynamic frequency resource allocation strategies in accordance with embodiments described herein.

Figure 3:
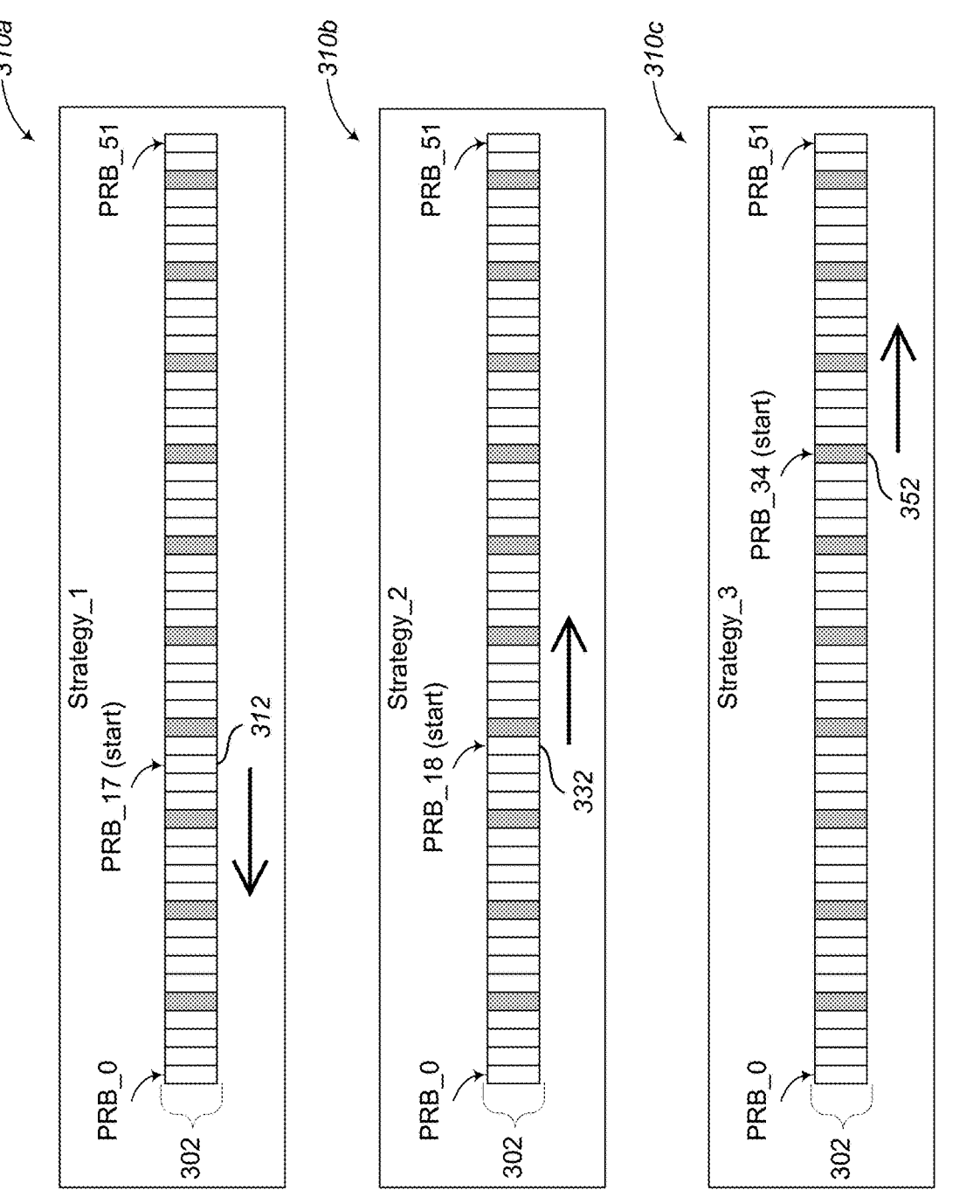

FIG. 3 illustrates three examples of different PRB allocation strategies 310a-310c for cells 112a-112c to use. In these examples, there are a plurality of PRBs 302, which are labeled from "PRB_0" to "PRB_51." The plurality of PRBs 302 each have a different frequency range starting at "PRB_0" with the lowest frequency PRB and sequentially increasing in frequency to "PRB_51" with the highest frequency PRB. The shaded PRBs shown in PRBs 302 are the same as the non-shaded PRBs. This shading is provided for ease of illustration and counting PRBs by sets of five.

In various embodiments, PRBs having lower frequencies closer to PRB_0 and PRBs having higher frequencies closer to PRB_51 may be referred to as outer or edge PRBs, and PRBs closer to the central frequencies may be referred to as inner PRBs. For example, PRB_0 to PRB_9 and PRB_42 to PRB_51 may be outer PRBs, and PRB_10 to PRB_41 may be inner PRBs. These examples of inner and outer PRBs are for illustrative purposes and the PRBs making up the inner and outer PRBs may be different. The plurality of PRB strategies 310a-310c may be generated to maximize the number of inner PRBs being allocated.

When allocating PRBs to a user device, a cell selects one or more of these PRBs 302 to allocate to the user device for a particular transmission time slot based on the strategy. For example, when utilizing PRB allocation strategy 310a (labeled as "Strategy_1"), the cell allocates PRBs starting with PRB_312 (labeled as "PRB_17") and going to the left, or lower in frequency. When utilizing PRB allocation strategy 310b (labeled as "Strategy_2"), the cell allocates PRBs starting with PRB_332 (labeled as "PRB_18") and going to the right, or higher in frequency. And when utilizing PRB allocation strategy 310c (labeled as "Strategy_3"), the cell allocates PRBs starting with PRB_352 (labeled as PRB_34) and going to the right, or higher in frequency. The cell allocates more that one PRB in the direction of the strategy when a user device requests to transmit data that is larger than one PRB. Accordingly, the number of PRBs allocated to the user device is based on the amount of data the user device intends to transmit, but the cell allocates the PRBs based on the strategy. When allocating PRBs to the left or lower in frequency, the cell wraps from RPB_0 to PRB_51 if additional PRBs are to be allocated. Similarly, when allocating PRBs to the right or higher in frequency, the cell wraps from RPB_51 to PRB_0 if additional PRBs are to be allocated.

As described herein, the cell-spectrum-allocation-management computing device 102 of FIG. 1 generates a plurality of different PRB allocation schemes from the plurality of PRB allocation strategies.

Figure 4:
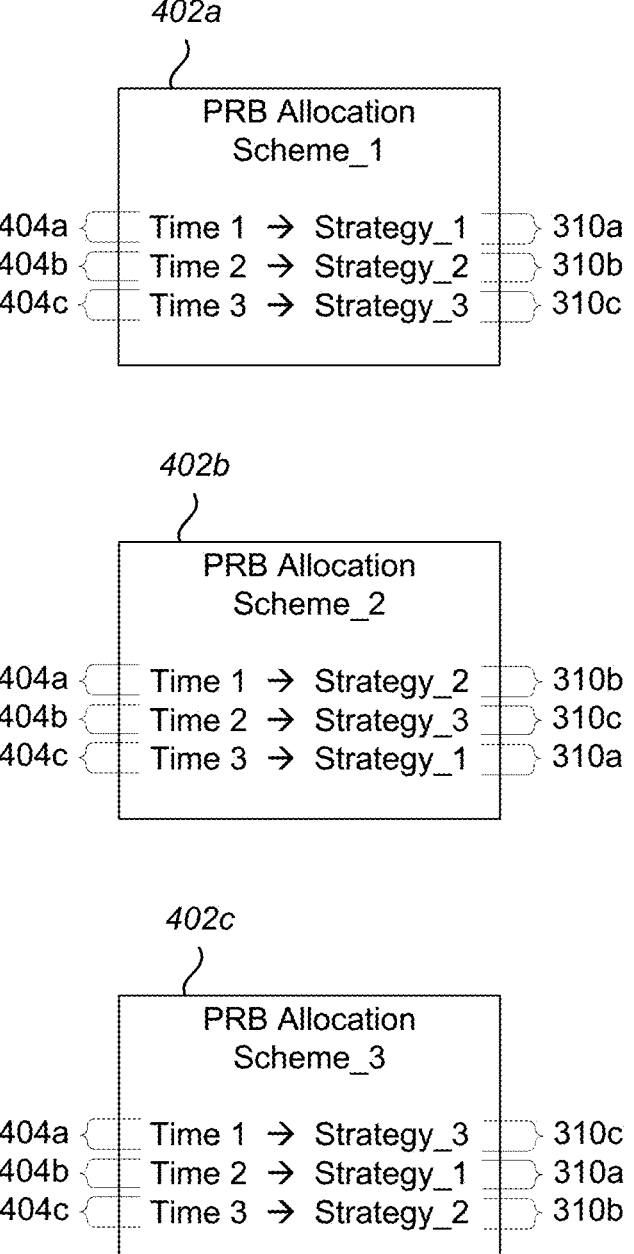

FIG. 4 illustrates three examples of different PRB allocation schemes 402a-402c for cells 112a-112c to use. Each PRB allocation scheme 402a-402c defines or maps different PRB allocation strategies 310a-310c from FIG. 3 for different transmission time slots 404a-404c. For example, PRB allocation scheme 402a defines PRB allocation strategy 310a (labeled "Strategy_1") for transmission time slot 404a (labeled "Time 1"); PRB allocation strategy 310b (labeled "Strategy_2") for transmission time slot 404b (labeled "Time 2"); and PRB allocation strategy 310c (labeled "Strategy_3") for transmission time slot 404c (labeled "Time 3"). In this way, if a cell is using PRB allocation scheme 402a and it is allocating PRBs to a user device for time slot 404b, then it will allocate PRBs to the user device using PRB allocation strategy 310b.

PRB allocation schemes 402b and 402c are similar to PRB allocation schemes 402a, but with different mappings between time slots 404a-404c and PRB allocation strategies 310a-310b. For example, PRB allocation scheme 402b defines PRB allocation strategy 310b (labeled "Strategy_2") for transmission time slot 404a (labeled "Time 1"); PRB allocation strategy 310c (labeled "Strategy_3") for transmission time slot 404b (labeled "Time 2"); and PRB allocation strategy 310a (labeled "Strategy_1") for transmission time slot 404c (labeled "Time 3"). And PRB allocation scheme 402a defines PRB allocation strategy 310c (labeled "Strategy_3") for transmission time slot 404a (labeled "Time 1"); PRB allocation strategy 310a (labeled "Strategy_1") for transmission time slot 404b (labeled "Time 2"); and PRB allocation strategy 310b (labeled "Strategy_2") for transmission time slot 404c (labeled "Time 3"). As illustrated, the use of the different PRB allocation schemes 402a-402c enable different cells that allocate PRBs for a same transmission time slot (e.g., time slot 404a) to utilize different PRB allocation strategies 310a-310c, which reduces the likelihood of conflicts or interference by the transmissions of different user devices during that same time slot.

As described herein, the cell-spectrum-allocation-management computing device 102 on FIG. 1 assigns different PRB allocation schemes to different cells.

Figure 5:
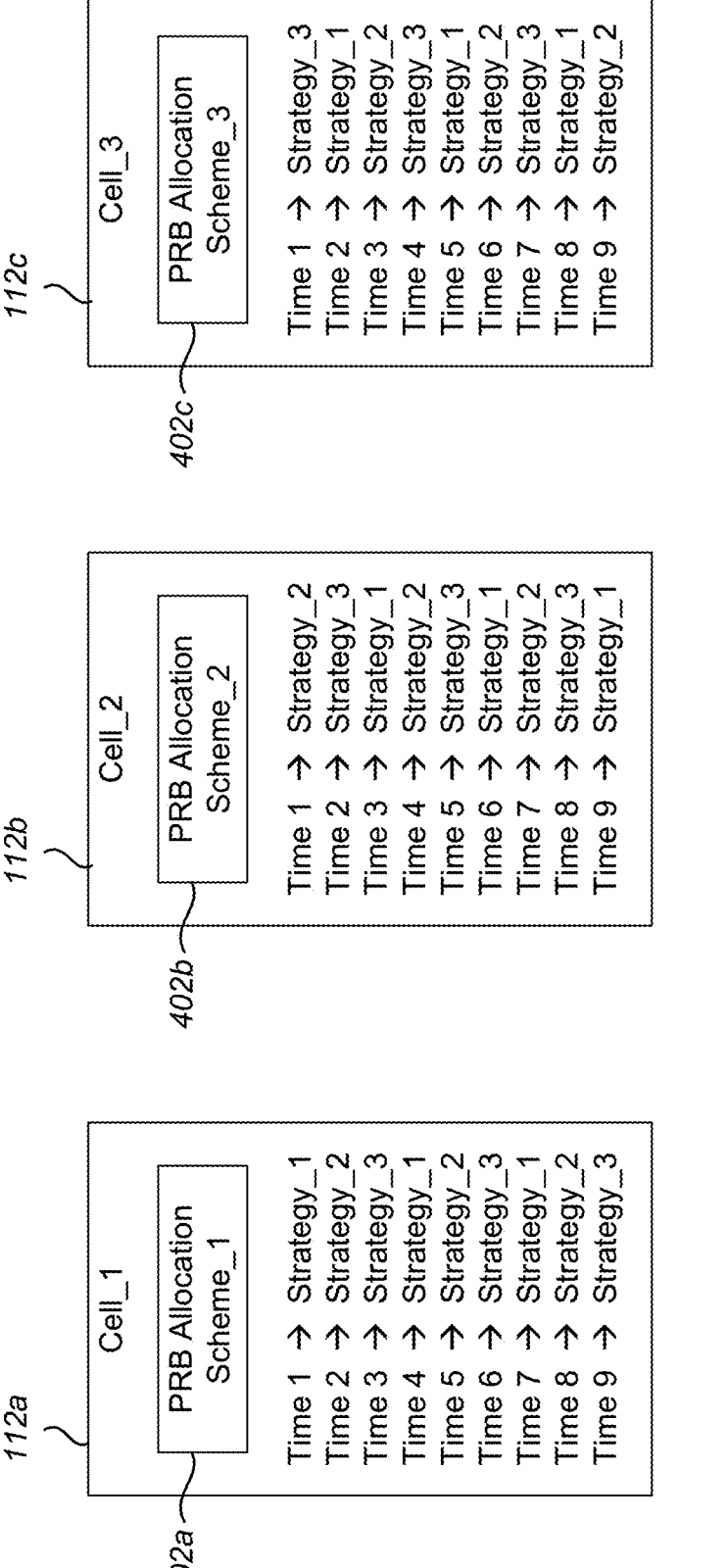

FIG. 5 illustrates the allocation of PRB allocation schemes 402a-402c to cells 112a-112c. In this example, cell 112a employs PRB allocation scheme 402a from FIG. 4, cell 112b employs PRB allocation scheme 402b from FIG. 4, and cell 112c employs PRB allocation scheme 402c from FIG. 4. By employing embodiments described herein, if each cell is to allocate PRBs during the transmission time slot labeled "Time 1," then cell 112a will allocate PRBs in accordance with "Strategy_1," cell 112b will allocate PRBs in accordance with "Strategy_2," and cell 112c will allocate PRBs in accordance with "Strategy_3." Similarly, if each cell is to allocate PRBs during the transmission time slot labeled "Time 8," then cell 112a will allocate PRBs in accordance with "Strategy_2," cell 112b will allocate PRBs in accordance with "Strategy_3," and cell 112c will allocate PRBs in accordance with "Strategy_1." In various situations and scenarios a cells 112a-112c may not allocate PRB for one or more transmission time slots, such as if no user devices have requested PRBs or if the cell determines that use of the PRB allocation strategy mapped to that time slot is not appropriate for a user device, as described herein.

FIG. 6 illustrates an example 600 in which a cell 112a utilizes a PRB allocation scheme 402a to allocate PRBs to user devices 602a-602d. User devices 602a-602d may be embodiments of user devices 124a-124c in FIG. 1. In this example, cell 112a has been assigned PRB allocation scheme 402a, similar to FIG. 5. Moreover, each of user devices 602a-602d have requested PRB allocation from cell 112a. User devices 602a and 602d are closer to cell 112a compared to user devices 602b and 602c, which is illustrated by the number of radio frequency symbols emanating from the user devices.

After receiving the transmission requests from the user devices 602a-602d, the cell 112a ranks the user devices 602a-602d for the different transmission time slots using the PRB allocation scheme 402a. In various embodiments, this ranking may be based on a distance each user device 602 is from the cell 112a and the PRB allocation strategy mapped to the time slots.

For example, transmission time slot "Time 1" is mapped to PRB allocation "Strategy_1." As discussed above in FIG. 3, PRB allocation "Strategy_1" starts at PRB_17 and allocates PRBs towards lower frequencies, which uses more outer or edge PRBs compared to the other PRB allocation strategies. Therefore, cell 112a ranks user device 206a higher than the other user devices (because it is close to the cell) and allocates PRBs to user device 602a (labeled "User Device_1") according to PRB allocation "Strategy_1" for time slot "Time 1."

For transmission time slot "Time 2," PRB allocation "Strategy_2" starts at PRB_18 and allocates PRBs towards higher frequencies, which uses more inner PRBs compared to the other PRB allocation strategies. Therefore, cell 112a ranks user device 206c higher than the other user devices (because it is far away from the cell) and allocates PRBs to user device 602c (labeled "User Device_3") according to PRB allocation "Strategy_2" for time slot "Time 2."

For transmission time slot "Time 3," PRB allocation "Strategy_3" starts at PRB_34 and allocates PRBs towards higher frequencies, which uses a combination of inner and outer PRBs, but fewer inner PRBs compared "Strategy_2." Therefore, cell 112a ranks user device 206d higher than the other user devices (because it is close to the cell) and allocates PRBs to user device 602d (labeled "User Device_4") according to PRB allocation "Strategy_3" for time slot "Time 3."

The remaining user device that is to be allocated PRB is user device 602b, which is far away from the cell 112a. Therefore, user device 602b would benefit from being allocated more inner PRBs compared to outer PRBs. Because transmission time slot "Time 4" is mapped to PRB allocation "Strategy_1," which uses more outer PRBs, the cell 112a does not allocate PRBs to user device 602b for transmission time slot "Time 4." Instead, the cell 112a allocates PRBs to user device 602b according to PRB allocation "Strategy_2" for transmission time slot "Time 5." Although the user device 602b has to wait one additional time slot to transmit data, it is being allocated PRBs that will likely improve the transmissions from the user device 602b to the cell 112a.

Although FIG. 6 is illustrated as ranking user devices 602a-602d based on their distance from cell 112a, embodiments are not so limited. Rather, cell 112a may rank user devices 602a-602d for different time slots and PRB allocation strategies based on power head room available to the user devices, path loss of the user devices, interference between the user devices and the cell, power spectral density, etc.

The operation of certain aspects will now be described with respect to FIGS. 7 and 8. Process 700 described in conjunction with FIG. 7 may be implemented by one or more processors or executed via circuitry on one or more computing devices, such as cell-spectrum-allocation-management computing device 102 in FIG. 1. In some embodiments, process 700 may be implemented by a cell 112 in FIG. 1. Process 800 described in conjunction with FIG. 8 may be implemented by one or more processors or executed via circuitry on one or more computing devices, such as cells 112a-112c in FIG. 1.

Figure 7:
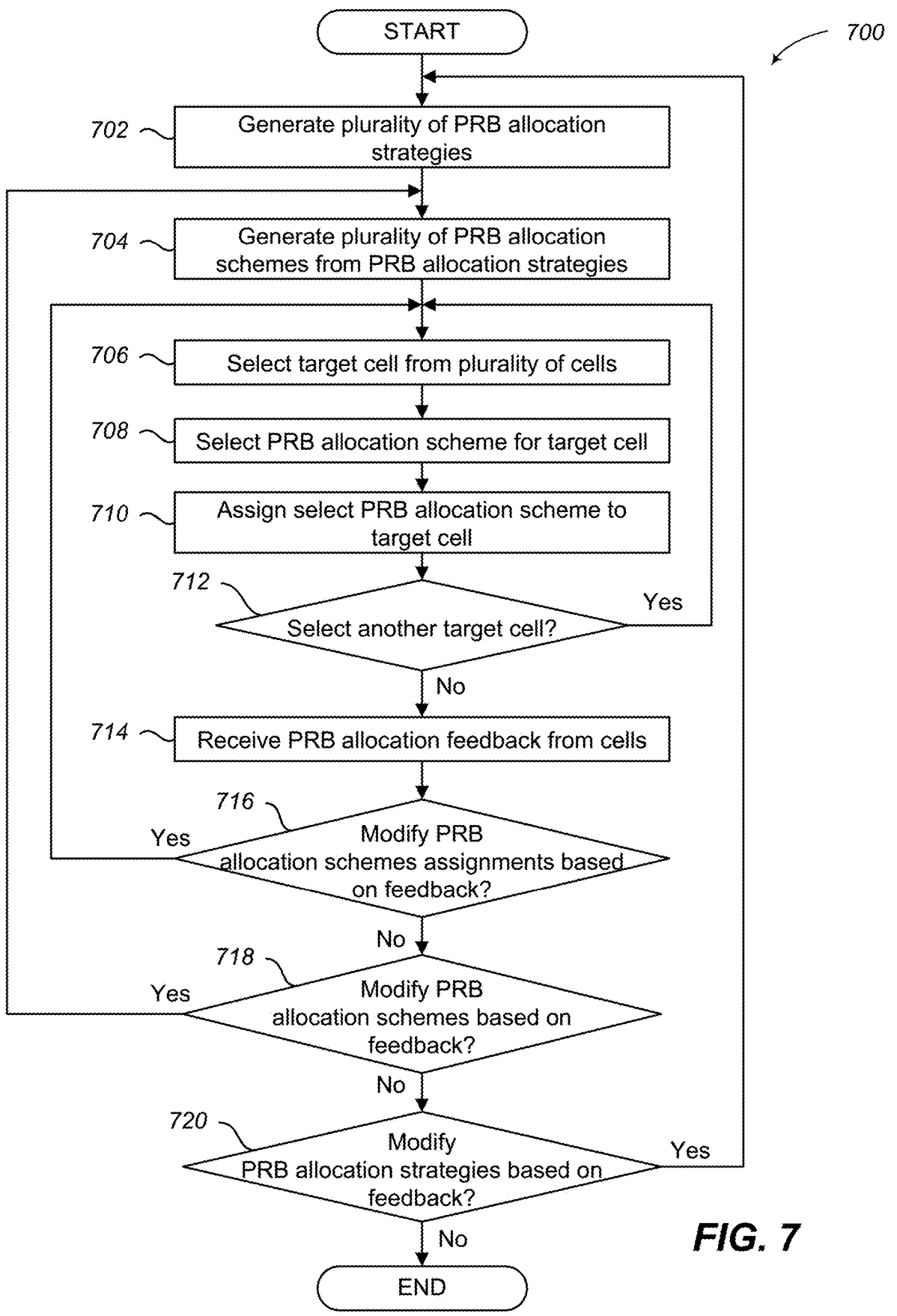
FIG. 7 illustrates a logical flow diagram showing one embodiment of a process for generating and assigning dynamic frequency resource allocation strategies in accordance with embodiments described herein.

FIG. 7 illustrates a logical flow diagram showing one embodiment of a process 700 for generating and assigning dynamic frequency resource allocation strategies in accordance with embodiments described herein. In various embodiments, process 700 may be implemented by the cell-spectrum-allocation-management computing device 102 or a cell 112 in FIG. 1.

Process 700 begins, after a start block, at block 702, where a plurality of PRB allocation strategies are generated. As discussed herein, a PRB allocation strategy defines a starting PRB and a direction (e.g., sequentially higher frequency PRBs or sequentially lower frequency PRBs) for a cell to allocate PRBs to user devices. In various embodiments, each PRB allocation strategy of the plurality of PRB allocation strategies have different starting PRBs. Moreover, the direction of allocation for each PRB allocation strategy is selected such that the potential of PRB overlap usage using different PRB allocation strategies by different cells at a same time is reduced. One non-exhaustive example of a plurality of PRB allocation strategies is illustrated in FIG. 3 and discussed above.

In various embodiments, the plurality of PRB allocation strategies may be generated in a manner to prioritize inner PRB allocation over outer PRB allocation. As described herein, allocating more inner PRBs to a user device that is further from the cell or has less power head room can improve the transmission of data using those PRB compared to if the user device used outer PRBs.

Process 700 proceeds after block 702 to block 704, where a plurality of PRB allocation schemes are generated from the plurality of PRB allocation strategies that were generated at block 702. As discussed herein, a PRB allocation scheme defines an order or sequence in which a cell uses different PRB allocation strategies for different transmission time slots. One non-exhaustive example of a plurality of PRB allocation schemes is illustrated in FIG. 4 and discussed above.

Process 700 continues after block 704 at block 706, where a target cell is selected from a plurality of cells. In various embodiments, the plurality of cells include cells within an area where user device transmissions with those cells may interfere with one another if they are transmitting using the same PRB during a same transmission time slot. In some embodiments, the plurality of cells include cells within a select geographical area or within a select network, or some combination thereof.

In some embodiments, the target cell may be selected from the plurality of cells based on its proximity to other cells in the plurality of cells. In this way, cells in closer proximity to one another are selected first compared to cells being further away. In other embodiments, the target cell may be randomly selected or selected in an order defined by an administrator. As discussed in more detail below in conjunction with decision block 712, process 700 may loop such that each cell in the plurality of cells is selected as a target cells. In this way, each cell in the plurality of cells is assigned a PRB allocation scheme at block 710.

Process 700 proceeds after block 706 to block 708, where a PRB allocation scheme is selected for the target cell. In various embodiments, the PRB allocation scheme is selected from the plurality of PRB allocation schemes generated at block 704. In some embodiments, the PRB allocation scheme is randomly selected or selected in an order defined by an administrator. In other embodiments, the PRB allocation scheme may be selected based on the selected target cell's proximity to other cells. In this way, cells in closer proximity to one another are assigned different PRB allocation schemes. In some situations, some cells in an area may be assigned the same PRB allocation scheme, but selecting the PRB allocation scheme based on cell proximity can reduce the possibility of cells near one another being allocated the same PRB allocation scheme, while allowing distant cells being assigned the same PRB allocation scheme.

Process 700 continues after block 708 at block 710, where the selected PRB allocation scheme is assigned to the target cell. The target cell is provided with information that identifies the selected PRB allocation scheme. In various embodiments, this information identifies the order of the plurality of PRB allocation strategies. In some embodiments, this information may also define each PRB allocation strategy. In some other embodiments, the target cell has already been provided information that defines the PRB allocation strategies and the different possible PRB allocation schemes, and assignment of the selected PRB allocation scheme to the target cell includes instructing the target cell to use one of the pre-provided PRB allocation schemes.

Process 700 proceeds after block 710 to decision block 712, where a determination is made whether to select another cell. In various embodiments, each of a plurality of cells in an area is selected as target cell to be assigned a PRB allocation scheme. As mentioned above, the cells may be selected as the target cell based on their proximity to other cells, randomly, or in an order defined by an administrator. If another cell is to be selected, process 700 loops to block 706 to select another cell from the plurality of cells; otherwise, process 700 flows to block 714.

At block 714, PRB allocation feedback is received from one or more cells. In various embodiments, one or more of the plurality of cells may provide information indicating which PRB allocation strategies they use most, whether there was interference with specific PRB allocation strategies, or other information related to the use of PRBs. In some embodiments, one or more cells may be queried to provide the PRB allocation feedback. In other embodiments, one or cells may randomly or at pre-selected intervals transmit the PRB allocation feedback to the computing device performing process 700.

Process 700 proceeds after block 714 to decision block 716, where a determination is made whether the allocation schemes assignments are to be modified based on the PRB allocation feedback. In some embodiments, only a single cell's the PRB allocation scheme assignment is to be modified. In other embodiments, each of the plurality of cells' PRB allocation scheme assignments are to be modified. In yet other embodiments, a subset of two or more, but not all, of the plurality of cells' PRB allocation scheme assignments are to be modified.

In various embodiments, this determination is based on an amount of interference identified in the PRB allocation feedback. For example, if two cells are near one another and were assigned the same PRB allocation scheme, then there may be more interference compared to if they were assigned different PRB allocation schemes. In other embodiments, a cell may indicate in its PRB allocation feedback that it does not use one or more PRB allocation strategies or it uses those PRB allocation strategies less than other PRB allocation strategies based on the PRB allocation scheme assigned to that cell.

In some embodiments, PRB allocation scheme assignments may be modified at pre-selected times, at pre-selected intervals, in response to network characteristics (e.g., current bandwidth exceeding a threshold amount, current interference exceeding a threshold amount, current latency exceeding a threshold amount, etc.), in response to administrator input, etc. In this way, PRB allocation scheme assignments can be dynamically modified based on current network conditions or as defined or selected by an administrator.

If one or more allocation scheme assignments are to be modified, process 700 loops to block 706 to select one or more cells and re-assign PRB allocation schemes to those cells; otherwise, process 700 flows to decision block 718.

At decision block 718, a determination is made whether one or more PRB allocation schemes are to be modified based on the PRB allocation feedback. In some embodiments, this determination is based on an amount of interference identified in the PRB allocation feedback. In other embodiments, this determination is based on how one or more cells utilize the different PRB allocation schemes. If one or more allocation schemes are to be modified, process 700 loops to block 704 to generate one or more new PRB allocation schemes; otherwise, process 700 flows to decision block 720.

At decision block 720, a determination is made whether one or more PRB allocation strategies are to be modified based on the PRB allocation feedback. In some embodiments, this determination is based on an amount of interference identified in the PRB allocation feedback. For example, if use of different PRB allocation strategies by different cells during a same transmission time slot results in interference above a threshold amount, then one or both of the PRB allocation strategies is to be modified. In other embodiments, this determination is based on how one or more cells utilize the different PRB allocation strategies. For example, if cells routinely avoid using a specific PRB allocation strategy within their assigned PRB allocation scheme, then that PRB allocation strategy be modified. If one or more allocation strategies are to be modified, process 700 loops to block 702 to modify one or more PRB allocation strategies; otherwise, process 700 terminates or otherwise returns to a calling process to perform other actions.

FIG. 8 illustrates a logical flow diagram showing one embodiment of a process 700 for employing dynamic frequency resource allocation strategies in accordance with embodiments described herein. In various embodiments, process 800 may be implemented by cells 112a-112c in FIG. 1.

Process 800 begins, after a start block, at block 802, where a PRB allocation scheme is received. In various embodiments, this PRB allocation scheme is received in response to assignment of the PRB allocation scheme at block 710 in FIG. 7. As discussed herein, the allocation scheme defines a utilization procedure for a plurality of PRB strategies.

Process 800 proceeds after block 802 at block 804, where user devices that are requesting PRB allocation are identified. In various embodiments, the cell receives one or more requests from a user device for PRB allocation so that it can transmit data to the cell. In some embodiments, the user devices identify an amount of data they intend to transmit, along with other transmission-related information. For example, in some embodiments, the user devices may provide their location information to the cell. In other embodiments, the cell may determine or estimate a distance between the user devices and the cell based on average channel-quality-indicator values provided by the user devices, receive power information of transmissions received by the cell from the user devices, time stamps of transmissions sent by the user devices, or other information that may be used to determine or estimate a location or distance of the user devices relative to the cell.

Process 800 continues after block 804 to block 806, where a transmission time slot is selected. In some embodiments, the selected transmission time slot may be a next available transmission time slot—a transmission time slot is available if it has not already been allocated to a user device for transmission. In other embodiments, the selected transmission time slot may be a transmission time slot in the future.

In various embodiments, the transmission time slot may be selected from a group having a plurality of time slots. In at least one embodiment, this group may start at a particular time or a next select number of transmission time slots. For example, the group of time slots may be the next three time slots, or the three time slots that make up one second (or other transmission time window). In various embodiments, the group of time slots may correspond to the time slots identified in the PRB allocation scheme. For example, the PRB allocation scheme may include three time slots, each having a corresponding PRB allocation strategy, and the group of time slots may also have three time slots.

Process 800 proceeds after block 806 at block 808, where a PRB allocation strategy is determined for the selected time slot based on the received PRB allocation scheme. As described herein, the PRB allocation scheme identifies which PRB allocation strategy the cell is to use for a specific time slot.

Process 800 continues after block 808 to block 810, where the user devices are ranked for the determined PRB allocation strategy for the selected time slot. In various embodiments, the ranking of the user devices may be dependent on which PRBs are to be allocated first based on the determined PRB allocation strategy and transmission capabilities of each user device. In at least one embodiment, the ranking may be based on the power head room of each user device, which may depend on the distance the user devices are from the cell. For example, if the determine PRB allocation strategy allocates more inner PRBs first (e.g., PRB allocation strategy 310b in FIG. 3), then user devices further from the cell or user devices having lower power head room may be ranked higher than user devices closer to the cell or user devices having higher power head room. In various embodiments, the ranking may also be based on the path loss of the user devices, e.g., interference between the user device and the cell, the power spectral density relative to the PRBs associated with the PRB allocation strategy, transmission power control for PRBs being allocated, etc.

Process 800 proceeds after block 810 at block 812, where a user device is selected based on the ranking. In various embodiments, the highest ranked user device for the determined PRB allocation strategy for the selected time slot is selected. In at least one embodiment, when a user device is selected and allocated PRBs at block 814, that same user device may not be ranked or selected when process 800 loops to allocate PRBs to each of the plurality of user devices that have requested PRBs.

Process 800 continues after block 812 to block 814, where the selected time slot and PRBs are allocated to the selected user device based on the PRB allocation strategy for the selected time slot. In various embodiments, one or a plurality of PRBs are selected for the selected user device based on the PRB allocation strategy for the selected time slot. For example, if the PRB allocation strategy for the selected time slot starts with PRB_18 and allocates in a direction of higher frequency (e.g., as shown with PRB allocation strategy 330 in FIG. 3), then the cell selects one or more PRBs to be allocated to the selected user device starting with PRB_18 and progressing in a direction of PRBs having higher frequencies.

Once selected, the cell allocates the selected time slot and selected PRBs to the selected user device. In at least one embodiment, the cell sends a transmission message to the selected user device notifying the user device of the selected time slot and the allocated PRBs that it can use to transmit data to the cell.

Process 800 proceeds after block 814 at decision block 816, where a determination is made whether to select another time slot. Another time slot is selected if more than one user device has been identified at block 804 as requesting PRBs. If another time slot is to be selected, process 800 loops to block 806 to select another time slot, determine (at block 808) a PRB allocation strategy for the other selected time slot, rank (at block 810) the remaining user devices (i.e., user devices that have not already been allocated a time slot and PRBs) that have requested PRBs, select (at block 812) a user device based on the ranking, and allocating (at block 814) the other time slot and PRBs; otherwise, process 800 terminates or otherwise returns to a calling process to perform other actions.

Figure 9:
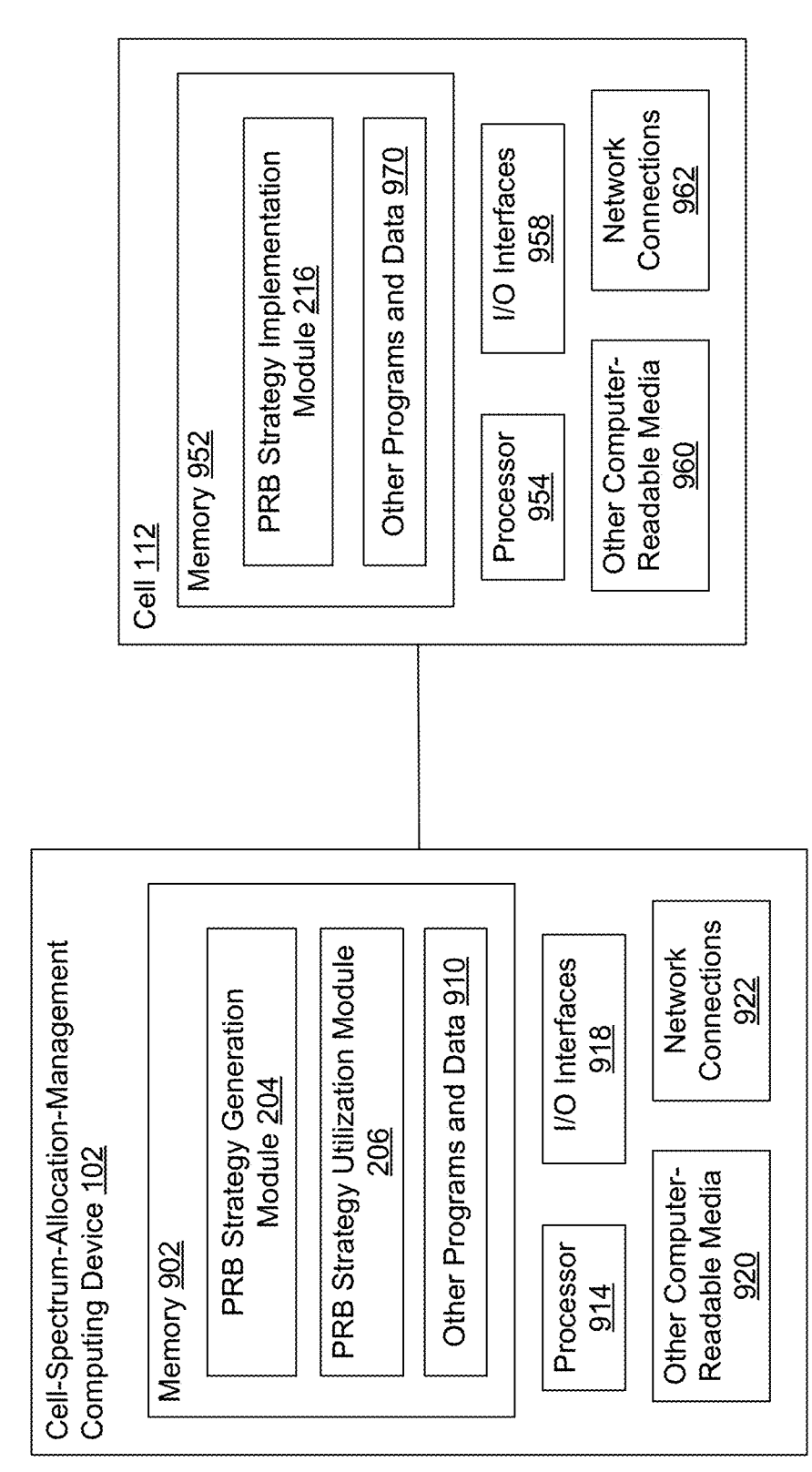
FIG. 9 shows a system diagram that describes various implementations of computing systems for implementing embodiments described herein.

FIG. 9 shows a system diagram that describes various implementations of computing systems for implementing embodiments described herein. System 900 includes a cell-spectrum-allocation-management computing device 102 and a cell 112. Similar to FIG. 1, system 900 may include multiple cells, but only one cell is shown in FIG. 9 for ease of discussion.

The cell-spectrum-allocation-management computing device 102 generates PRB allocation strategies, generates PRB allocation schemes, and instructs cell 112 on which PRB allocation scheme to use during a particular time, as described herein. One or more special-purpose computing systems may be used to implement the cell-spectrum-allocation-management computing device 102. Accordingly, various embodiments described herein may be implemented in software, hardware, firmware, or in some combination thereof. The cell-spectrum-allocation-management computing device 102 may include memory 902, one or more processors 914 (e.g., central processing unit, microcontroller, virtual processing resources, etc.), I/O interfaces 918, other computer-readable media 920, and network connections 922.

Memory 902 may include one or more various types of non-volatile and/or volatile storage technologies. Examples of memory 902 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 902 may be utilized to store information, including computer-readable instructions that are utilized by processor 914 to perform actions, including embodiments described herein.

Memory 902 may have stored thereon PRB strategy generation module 204 and PRB strategy utilization module 206. Although the PRB strategy generation module 204 and PRB strategy utilization module 206 are illustrated as separate modules, embodiments are not so limited. Rather, one module or a plurality of modules may be employed to perform the functionality of the PRB strategy generation module 204 and the PRB strategy utilization module 206. Moreover, the functionality of these modules may also be performed using circuitry or other computer hardware components or software.

The PRB strategy generation module 204 is configured to generate a plurality of PRB allocation strategies that are to be used by one or more cells 112, as described herein. For each of the plurality of PRB strategies, the PRB strategy generation module 204 selects or defines a starting PRB and a direction in which PRBs are allocated for a particular user device for a particular transmission time slot. In some embodiments, the PRB strategy generation module 204 may generate different or separate PRB allocation strategies for different groups of cells or for different networks.

The PRB strategy utilization module 206 is configured to generate a plurality of PRB allocation schemes and the assign those schemes to one or more cells, as described herein. In various embodiments, the PRB strategy utilization module 206 may modify or change the PRB allocation schemes or assignments over time. In some embodiments, the PRB strategy utilization module 206 may generate different or separate PRB allocation schemes for different groups of cells or for different networks.

Memory 902 may also store other programs and data 910.

Network connections 922 are configured to communicate with other computing devices, such as cells 112. In various embodiments, the network connections 922 include transmitters and receivers (not illustrated) to send and receive data as described herein. I/O interfaces 918 may include video interfaces, audio interfaces, other data input or output interfaces, or the like. The I/O interfaces 918 may be configured to enable an administrator to generate, modify, or change one or more PRB allocation strategies or one or more PRB allocation schemes. Other computer-readable media 920 may include other types of stationary or removable computer-readable media, such as removable flash drives, external hard drives, or the like.

The following is a summarization of the claims as filed.

A system may be summarized as including a computing device, including a first memory that stores first computer instructions; and a first processor configured to execute the first computer instructions to generate a first physical resource block allocation strategy; generate a second physical resource block allocation strategy that is different from the first physical resource block allocation strategy; generate a first allocation scheme that defines utilizing the first physical resource block allocation strategy during a first time slot and utilizing the second physical resource block allocation strategy during a second time slot; and generate a second allocation scheme that defines utilizing the second physical resource block allocation strategy during the first time slot and utilizing the first physical resource block allocation strategy during the second time slot; a first cell in a wireless network, including a second memory that stores second computer instructions; and a second processor configured to execute the second computer instructions to receive the first allocation scheme from the computing device; allocate the first time slot and at least one first physical resource block based on the first physical resource block allocation strategy; and allocate the second time slot and at least one second physical resource block based on the second physical resource block allocation strategy; and a second cell in the wireless network, including a third memory that stores third computer instructions; and a third processor configured to execute the third computer instructions to receive the second allocation scheme from the computing device; allocate the first time slot and at least one third physical resource block based on the second physical resource block allocation strategy; and allocate the second time slot and at least one forth physical resource block based on the first physical resource block allocation strategy. The second processor may be configured to further execute the second computer instructions to identify a first user device and a second user device that have requested physical resource block allocation; and rank the first user device and the second user device for the first time slot based on the first physical resource block allocation strategy and for the second time slot based on the second physical resource block allocation strategy.

The system may further include, wherein the second processor is configured to further execute the second computer instructions to identify a first user device and a second user device that have requested physical resource block allocation from the first cell; and rank the first user device and the second user device for the first time slot based on the first physical resource block allocation strategy and for the second time slot based on the second physical resource block allocation strategy; wherein the third processor is configured to further execute the third computer instructions to identify a third user device and a fourth user device that have requested physical resource block allocation from the second cell; and rank the third user device and the fourth user device for the first time slot based on the second physical resource block allocation strategy and for the second time slot based on the first physical resource block allocation strategy.

The first processor may be configured to further execute the first computer instructions to provide the first allocation scheme to the first cell; and provide the second allocation scheme to the second cell. The first processor may generate the first physical resource block allocation strategy and the second physical resource block allocation strategy by further executing the first computer instructions to define the first physical resource block allocation strategy as starting at a first physical resource block and allocating towards lower frequencies; and define the second physical resource block allocation strategy as starting at a second physical resource block and allocating towards higher frequencies.

The second processor may allocate the first time slot and the at least one first physical resource block and may allocate the second time slot and the at least one second physical resource block by further executing the first computer instructions to identify a first user device and a second user device that have requested physical resource block allocation from the first cell; may determine whether the first user device or the second user device is further from the first cell; may determine whether the first physical resource block allocation strategy utilizes middle physical resource blocks first or outer physical resource blocks first; and in response to the first user device being further from the first cell and the first physical resource block allocation strategy utilizing middle physical resource blocks first may allocate the first time slot and the at least one first physical resource block to the first user device utilizing the middle physical resource blocks first; and may allocate the second time slot and the at least one second physical resource block to the second user device utilizing the outer physical resource blocks first. The second processor may allocate the first time slot and the at least one first physical resource block and may allocate the second time slot and the at least one second physical resource block by further executing the first computer instructions to identify a first user device and a second user device that have requested a physical resource block allocation from the first cell; may determine whether the first user device or the second user device is further from the first cell; may determine whether the first physical resource block allocation strategy utilizes middle physical resource blocks first or outer physical resource blocks first; and in response to the first user device being closer to the first cell and the first physical resource block allocation strategy utilizing middle physical resource blocks first may allocate the first time slot and the at least one first physical resource block to the second user device utilizing the middle physical resource blocks first; and may allocate the second time slot and the at least one second physical resource block to the first user device utilizing the outer physical resource blocks first.

The first processor may be configured to further execute the first computer instructions to receive feedback from the first cell regarding physical resource block allocations; may modify the first physical resource block allocation strategy based on the feedback; and may notify the first cell and the second cell of the modified first physical resource block allocation strategy. The first processor may be configured to further execute the first computer instructions to receive feedback from the first cell regarding physical resource block allocations; may modify the first allocation scheme and the second allocation scheme based on the feedback; and may provide the modified first allocation scheme to the first cell and the modified second allocation scheme to the second cell.

A computing device may be summarized as including a memory that stores computer instructions; a processor that, when executing the computer instructions, causes the computing device to identify a plurality of cell towers in a wireless network; generate a plurality of physical resource block allocation strategies for the plurality of cell towers; generate a plurality of allocation schemes for the plurality of cell towers, wherein each separate allocation scheme of the plurality of allocation schemes defines a different utilization procedure for the plurality of physical resource block allocation strategies; and assign a separate allocation scheme of the plurality of allocation schemes to separate cell towers of the plurality of cell towers. Generating the plurality of physical resource block allocation strategies may include defining a first physical resource block allocation strategy indicating physical resource block allocation to user devices starting at a first physical resource block and allocating towards lower frequencies; defining a second physical resource block allocation strategy indicating physical resource block allocation to user devices starting at a second physical resource block and allocating towards higher frequencies, wherein the second physical resource block may be a higher frequency block compared to the first physical resource block; and defining a third physical resource block allocation strategy indicating physical resource block allocation to user devices starting at a third physical resource block and allocating towards higher frequencies, wherein the third physical resource block may be a higher frequency block compared to the second physical resource block. Generating the plurality of physical resource block allocation strategies may include identifying a plurality of physical resource blocks from a lowest block having a lowest frequency of the plurality of physical resource blocks to a highest block having a highest frequency of the plurality of physical resource blocks; defining a first physical resource block allocation strategy where a cell tower may allocate physical resource blocks starting at physical resource block seventeen and allocating towards the lowest block; defining a second physical resource block allocation strategy where the cell tower may allocate physical resource blocks starting at physical resource block eighteen and allocating towards the highest block; and defining a third physical resource block allocation strategy where the cell tower may allocate physical resource blocks starting at a physical resource block thirty-four and allocating towards the highest block.

The processor, when executing the computer instructions to generate the plurality of allocation schemes, may further cause the computing device to define a first allocation scheme identifying a first order in which the plurality of physical resource block allocation strategies is to be utilized among a plurality of time slots; define a second allocation scheme identifying a second order in which the plurality of physical resource block allocation strategies is to be utilized among the plurality of time slots, wherein the second order is different from the first order; and define a third allocation scheme identifying a third order in which the plurality of physical resource block allocation strategies is to be utilized among the plurality of time slots, wherein the third order is different from the first order and the second order.

The processor, when executing the computer instructions to assign the separate allocation scheme of the plurality of allocation schemes to the separate cell towers, may further cause the computing device to assign a first allocation scheme to a first cell tower, wherein the first allocation scheme identifies a first order in which the first cell tower is to utilize the plurality of physical resource block allocation strategies; assign a second allocation scheme to a second cell tower, wherein the second allocation scheme is different from the first allocation scheme and the second allocation scheme identifies a second order that is different from the first order in which the second cell tower is to utilize the plurality of physical resource block allocation strategies; and assign a third allocation scheme to a third cell tower, wherein the third allocation scheme is different from the first allocation scheme and the second allocation scheme and the second allocation scheme identifies a third order that is different from the first order and the second order in which the third cell tower is to utilize the plurality of physical resource block allocation strategies.

The processor, when executing the computer instructions, may further cause the computing device to receive feedback from at least one of the plurality of cell towers regarding physical resource block allocations; modify at least one physical resource block allocation strategy of the plurality of physical resource block allocation strategies based on the feedback; and notify the plurality of cell towers of the modified at least one modified physical resource block allocation strategy.

The processor, when executing the computer instructions, may further cause the computing device to receive feedback from at least one of the plurality of cell towers regarding physical resource block allocations; modify at least one allocation scheme of the plurality of allocation schemes based on the feedback; and provide the at least one modified allocation scheme to at least one cell tower of the plurality of cell towers.

A method may be summarized as including receiving, at a cell of a wireless network, an allocation scheme that defines a utilization procedure for a plurality of physical resource block allocation strategies; identifying, by the cell, a plurality of user devices that have requested physical resource block allocation; determining, by the cell, a corresponding physical resource block allocation strategy from the plurality of physical resource block allocation strategies for each corresponding time slot of a plurality of time slots based on the allocation scheme; ranking, by the cell, the plurality of user devices for each corresponding time slot based on the corresponding physical resource block alloca- tion strategy; and allocating, by the cell, a corresponding time slot and at least one physical resource block to each corresponding user device of the plurality of user devices based on the rankings and the corresponding physical resource block allocation strategy for the corresponding time slot.

Ranking the plurality of user devices may further include determining, by the cell, a relative distance that each of the plurality of user devices is away from the cell; determining, by the cell, a number of requested physical resource blocks for each of the plurality of user devices; and ranking the plurality of user devices based on the relative distance and the number of requested physical resource blocks for each of the plurality of user devices. Allocating, by the cell, a corresponding time slot and at least one physical resource block to each corresponding user device of the plurality of user devices may determine whether a first physical resource block allocation strategy of the plurality of physical resource block allocation strategies utilizes middle physical resource blocks first or outer physical resource blocks first; and in response to a first user device being further from the cell and the first physical resource block allocation strategy utilizing the middle physical resource blocks first may allocate a first time slot and at least one first physical resource block to the first user device utilizing the middle physical resource blocks first; and may allocate a second time slot and at least one second physical resource block to a second user device utilizing the outer physical resource blocks first.

The method may further include collecting feedback data on physical resource block allocations; and provide the feedback data to a server to modify at least one physical resource block allocation strategy of the plurality of physical resource block allocation strategies.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a computing device, comprising:
a first memory that stores first computer instructions; and
a first processor configured to execute the first computer instructions to:
generate a first physical resource block allocation strategy as starting at a first physical resource block and allocating towards a first direction of frequencies;
generate a second physical resource block allocation strategy as starting at a second physical resource block and allocating towards a second direction of frequencies;
generate a first allocation scheme that defines utiliz- ing the first physical resource block allocation strategy during a first time slot and utilizing the second physical resource block allocation strategy during a second time slot; and
generate a second allocation scheme that defines utilizing the second physical resource block allo- cation strategy during the first time slot and uti- lizing the first physical resource block allocation strategy during the second time slot;
a first cell in a wireless network, comprising:
a second memory that stores second computer instruc- tions; and
a second processor configured to execute the second computer instructions to:
receive the first allocation scheme from the comput- ing device;
allocate the first time slot and at least one first physical resource block based on the first physical resource block allocation strategy; and
allocate the second time slot and at least one second physical resource block based on the second physical resource block allocation strategy; and
a second cell in the wireless network, comprising:
a third memory that stores third computer instructions; and
a third processor configured to execute the third com- puter instructions to:
receive the second allocation scheme from the com- puting device;
allocate the first time slot and at least one third physical resource block based on the second physical resource block allocation strategy; and
allocate the second time slot and at least one forth physical resource block based on the first physical resource block allocation strategy.

2. The system of claim 1, wherein the second processor is configured to further execute the second computer instruc- tions to:
identify a first user device and a second user device that have requested physical resource block allocation; and
rank the first user device and the second user device for the first time slot based on the first physical resource block allocation strategy and for the second time slot based on the second physical resource block allocation strategy.

3. The system of claim 1, further comprising:
wherein the second processor is configured to further execute the second computer instructions to:
identify a first user device and a second user device that have requested physical resource block allocation from the first cell; and
rank the first user device and the second user device for the first time slot based on the first physical resource block allocation strategy and for the second time slot based on the second physical resource block alloca- tion strategy;
wherein the third processor is configured to further execute the third computer instructions to:
identify a third user device and a fourth user device that have requested physical resource block allocation from the second cell; and
rank the third user device and the fourth user device for the first time slot based on the second physical resource block allocation strategy and for the second time slot based on the first physical resource block allocation strategy.

4. The system of claim 1, wherein the first processor is configured to further execute the first computer instructions to:

provide the first allocation scheme to the first cell; and provide the second allocation scheme to the second cell.

5. The system of claim 1, wherein the first processor generates the first physical resource block allocation strategy and the second physical resource block allocation strategy by further executing the first computer instructions to:

define the first physical resource block allocation strategy as allocating towards lower frequencies; and define the second physical resource block allocation strategy allocating towards higher frequencies.

6. The system of claim 1, wherein the second processor allocates the first time slot and the at least one first physical resource block and allocates the second time slot and the at least one second physical resource block by further executing the first computer instructions to:

identify a first user device and a second user device that have requested physical resource block allocation from the first cell;

determine whether the first user device or the second user device is further from the first cell;

determine whether the first physical resource block allocation strategy utilizes middle physical resource blocks first or outer physical resource blocks first; and in response to the first user device being further from the first cell and the first physical resource block allocation strategy utilizing middle physical resource blocks first:

allocate the first time slot and the at least one first physical resource block to the first user device utilizing the middle physical resource blocks first; and allocate the second time slot and the at least one second physical resource block to the second user device utilizing the outer physical resource blocks first.

7. The system of claim 1, wherein the second processor allocates the first time slot and the at least one first physical resource block and allocates the second time slot and the at least one second physical resource block by further executing the first computer instructions to:

identify a first user device and a second user device that have requested physical resource block allocation from the first cell;

determine whether the first user device or the second user device is further from the first cell;

determine whether the first physical resource block allocation strategy utilizes middle physical resource blocks first or outer physical resource blocks first; and in response to the first user device being closer to the first cell and the first physical resource block allocation strategy utilizing middle physical resource blocks first:

allocate the first time slot and the at least one first physical resource block to the second user device utilizing the middle physical resource blocks first; and allocate the second time slot and the at least one second physical resource block to the first user device utilizing the outer physical resource blocks first.

8. The system of claim 1, wherein the first processor is configured to further execute the first computer instructions to:

receive feedback from the first cell regarding physical resource block allocations;

modify the first physical resource block allocation strategy based on the feedback; and notify the first cell and the second cell of the modified first physical resource block allocation strategy.

9. The system of claim 1, wherein the first processor is configured to further execute the first computer instructions to:

receive feedback from the first cell regarding physical resource block allocations;

modify the first allocation scheme and the second allocation scheme based on the feedback; and provide the modified first allocation scheme to the first cell and the modified second allocation scheme to the second cell.

10. A method, comprising:

generating a first physical resource block allocation strategy as starting at a first physical resource block and allocating towards a first direction of frequencies;

generating a second physical resource block allocation strategy as starting at a second physical resource block and allocating towards a second direction of frequencies;

generating a first allocation scheme that defines utilizing the first physical resource block allocation strategy during a first time slot and utilizing the second physical resource block allocation strategy during a second time slot;

causing a first cell in a wireless network to allocate the first time slot and at least one first physical resource block based on the first physical resource block allocation strategy and to allocate the second time slot and at least one second physical resource block based on the second physical resource block allocation strategy;

generating a second allocation scheme that defines utilizing the second physical resource block allocation strategy during the first time slot and utilizing the first physical resource block allocation strategy during the second time slot;

causing a second cell in the wireless network to allocate the first time slot and at least one third physical resource block based on the second physical resource block allocation strategy and to allocate the second time slot and at least one forth physical resource block based on the first physical resource block allocation strategy.

11. The method of claim 10, comprising:

providing the first allocation scheme to the first cell; and providing the second allocation scheme to the second cell.

12. The method of claim 10, wherein generating the first physical resource block allocation strategy and generating the second physical resource block allocation strategy comprises:

defining the first physical resource block allocation strategy as allocating towards lower frequencies; and defining the second physical resource block allocation strategy allocating towards higher frequencies.

13. The method of claim 10, further comprising:

receiving feedback from the first cell regarding physical resource block allocations;

modifying the first physical resource block allocation strategy based on the feedback; and notifying the first cell and the second cell of the modified first physical resource block allocation strategy.

14. The method of claim 10, further comprising:

receiving feedback from the first cell regarding physical resource block allocations;

modifying the first allocation scheme and the second allocation scheme based on the feedback; and providing the modified first allocation scheme to the first cell and the modified second allocation scheme to the second cell.

15. A computing device, comprising:

a memory that stores computer instructions; and a processor configured to execute the computer instructions to:

generate a first physical resource block allocation strategy as starting at a first physical resource block and allocating towards a first direction of frequencies;

generate a second physical resource block allocation strategy as starting at a second physical resource block and allocating towards a second direction of frequencies;

generate a first allocation scheme that defines utilizing the first physical resource block allocation strategy during a first time slot and utilizing the second physical resource block allocation strategy during a second time slot;

cause a first cell in a wireless network to allocate the first time slot and at least one first physical resource block based on the first physical resource block allocation strategy and to allocate the second time slot and at least one second physical resource block based on the second physical resource block allocation strategy;

generate a second allocation scheme that defines utilizing the second physical resource block allocation strategy during the first time slot and utilizing the first physical resource block allocation strategy during the second time slot;

cause a second cell in the wireless network to allocate the first time slot and at least one third physical resource block based on the second physical resource block allocation strategy and to allocate the second time slot and at least one forth physical resource block based on the first physical resource block allocation strategy.

16. The computing device of claim 15, wherein the processor is configured to further execute the computer instructions to:

provide the first allocation scheme to the first cell; and provide the second allocation scheme to the second cell.

17. The computing device of claim 15, wherein the processor generates the first physical resource block allocation strategy and the second physical resource block allocation strategy by further executing the computer instructions to:

define the first physical resource block allocation strategy as allocating towards lower frequencies; and define the second physical resource block allocation strategy allocating towards higher frequencies.

18. The computing device of claim 15, wherein the processor is configured to further execute the computer instructions to:

receive feedback from the first cell regarding physical resource block allocations;

modify the first physical resource block allocation strategy based on the feedback; and notify the first cell and the second cell of the modified first physical resource block allocation strategy.

19. The computing device of claim 15, wherein the processor is configured to further execute the computer instructions to:

receive feedback from the first cell regarding physical resource block allocations;

modify the first allocation scheme and the second allocation scheme based on the feedback; and provide the modified first allocation scheme to the first cell and the modified second allocation scheme to the second cell.

* * * * *